INVENTOR
WILLIAM B. JOHNSON

BY Griffin and Stokes
ATTORNEYS

Oct. 8, 1968 W. B. JOHNSON 3,405,398

THIN FILM DETECTOR

Filed April 16, 1964 2 Sheets-Sheet 2

United States Patent Office 3,405,398

Patented Oct. 8, 1968

3,405,398

THIN FILM DETECTOR

William B. Johnson, Richfield, Minn., assignor to Sperry Rand Corporation, New York, N.Y., a corporation of Delaware Filed Apr. 16, 1964, Ser. No. 360,317
28 Claims. (Cl. 340—174)

ABSTRACT OF THE DISCLOSURE

A magnetic thin film search memory employing thin films as output detectors. A signal on a drive winding oriented parallel to the preferred magnetic axis of a "steered" thin film rotates the flux substantially perpendicular to the preferred magnetic axis. Signals are selectively applied to plural drive windings associated with plural steering films to rotate the flux therein. A closed loop transfer winding is inductively coupled with the steering films and the steered film and is oriented substantially transverse to the preferred magnetic axis of the steered film. The signals applied to the drive windings of the steering films either begin or terminate at the same time the signal on the drive winding of the steered film is terminated. The current induced in the transfer winding by the steering films controls the direction in which the rotated flux of the steered film returns to the preferred magnetic axis.

This invention broadly relates to means for directly storing information into a magnetic thin film element by the induced output signal of another magnetic thin film element, and more particularly concerns a magnetic thin film search memory configuration in which magnetic thin films are also used as the detectors for the output word sense lines.

Magnetic thin film search memories have come into wide use in the information retrieval art because of their speed of operation and high packing density. When one typical form of thin film search memory is interrogated or compared with a search word in order to determine if and where a word match occurs in the memory, a said match is indicated by the absence of an active induced signal on the word sense line of the particular location in which said matched word is stored. Other search memory locations which contain mismatched words do have voltages induced on their output word sense windings. Consequently, it is necessary in many environments when using this type of search memory to terminate each word sense line thereof with a detector circuit which performs logical negation or inversion so that an active match signal can be applied to a utilization means. The ideal detector circuit also provides thresholding so that transient signals on a word line are not interpreted as a mismatch. To achieve negation and thresholding, present day search memories normally terminate each word sense line in some active semiconductor device such as a transistor amplifier-inverter. Thus, a search memory matrix of a two thousand word capacity requires a minimum of two thousand semiconductor elements for word line termination alone.

The present invention provides means whereby thin magnetic films themselves may be substituted for active semiconductor elements as sense line detectors. Such substitution significantly reduces both the hardware and power requirements, and therefore removes a serious practical handicap to the building of truly large search memories. The novel principle employed is that of steering the detector film with the output from one or more search memory films in the following manner, where the terms "transverse" and "longitudinal" have reference to the preferred magnetic (easy) axis of the thin films. A transverse magnetic field substantially greater than the film anisotrophy is temporarily applied to the detector film, being then terminated in the presence of a longitudinal magnetic field of duration and magnitude just sufficient to steer the detector film remanent flux back to a predetermined direction along the preferred magnetic axis. This longitudinal field in turn is provided by current in a transfer line or winding which is inductively coupled both with the detector (the steered film) and another magnetic thin film (the steering film) which, for example, could be an element in a thin film search memory matrix. Thus, for one particular search memory application, the transfer loop would be a word sense line output of the search memory on which may appear a current signal at the time the search memory is interrogated according to whether or not a match has been found. Where a search memory location has a mismatched word, the word sense line thereof produces an output signal sufficient to steer the flux in the detector thin film to one predetermined direction along its easy axis. On the other hand, if a perfect match is found in the search memory location, the absence of a signal on the word sense line permits a steady D.C. bias current in the sense line to steer the remanent flux in the detector film to the opposite easy axis direction. An alternative mode of operation would be skewing the direction of the detector film transverse field with respect to the detector film hard axis so that a longitudinal component of said transverse field permits flux return to said opposite easy axis direction, thus eliminating the need for the constant D.C. bias current. The detector film is then subsequently interrogated with a transverse field to produce an output signal of one polarity for one state of the detecting film, and an output of the opposite polarity for the opposite state of the detecting film. The invention in its broadest aspect is also useful in detecting outputs from thin films employed in other than a search memory matrix.

One object of the present invention is to therefore provide a novel magnetic thin film detector of another magnetic thin film, wherein the latter provides a steering field to the former at a specified time.

A further object of the present invention is to provide a novel magnetic thin film search memory system which employs magnetic thin films as output sense line detectors of the word organized search memory locations.

These and other objects of the present invention will become apparent during the course of the following description to be read in view of the drawings, in which.

Figure 1:
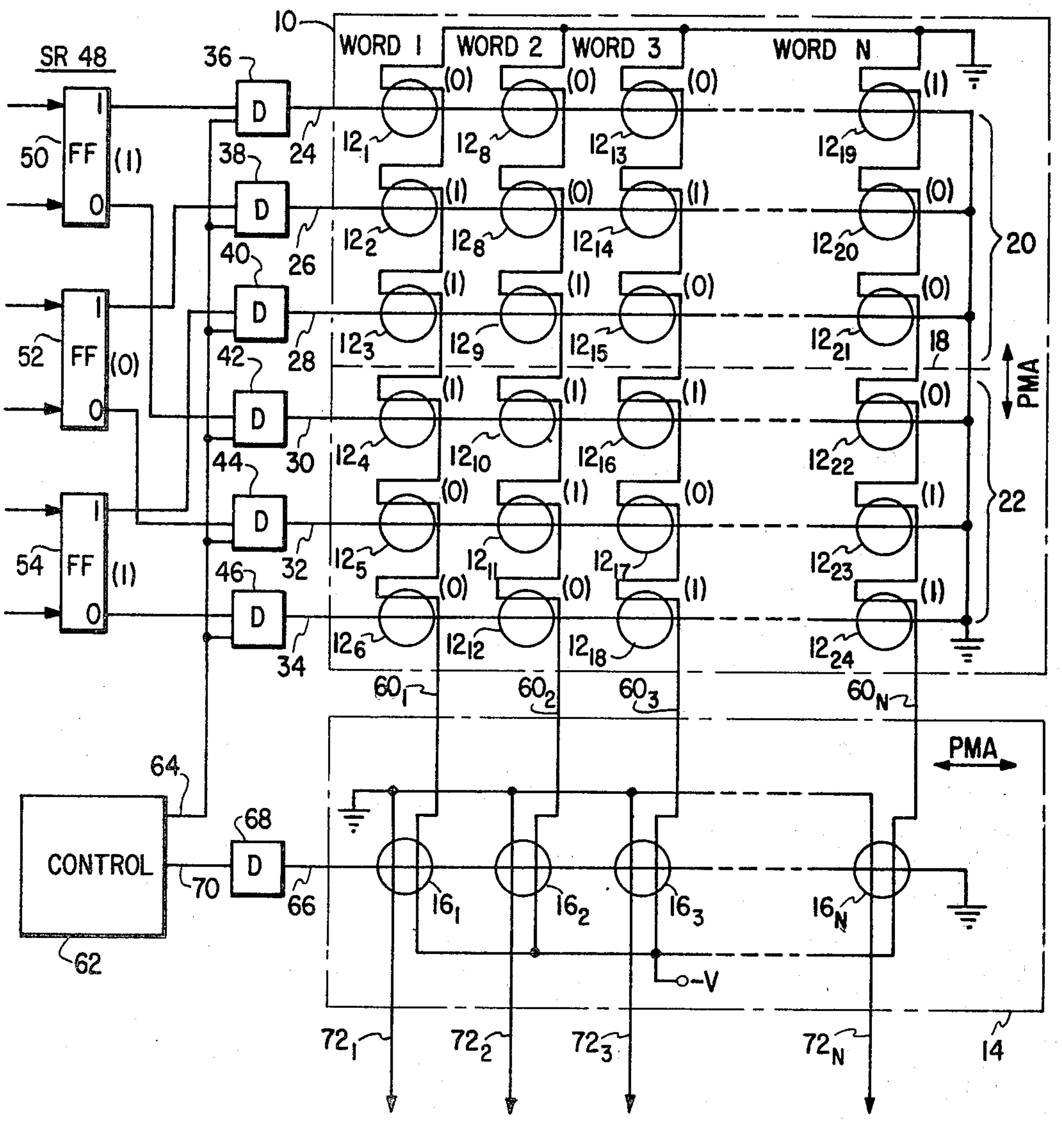
FIGURE 1 is a diagrammatic representation of a novel search memory combination incorporating magnetic thin film output detectors.

FIGURE 1 shows a search memory environment in which the present invention finds particular, although not exclusive, use. Dot-dash rectangle 10 encloses a plurality of thin film magnetic elements 12 which are arranged in a two dimensional rectangular matrix configuration. Each element 12 consists of at least one magnetic thin film core having at least one preferred magnetic axis (PMA) along which lies, in either a 0 bit direction or the opposite 1 bit direction, the remanent flux vector in the absence of any external magnetic field applied thereto. In FIGURE 1 all elements 12 have their PMA vertically oriented. By means not shown, the remanent flux vector in each element 12 can be selectively made to lie so as to represent either a 0 or a 1 bit value. These elements 12 comprise the storage part of the entire search memory system in which a group of binary words are held each in a different matrix vertical column. Thus, a specific piece of information identified by a known identifier, or known code, but unknown in memory location can be located in matrix 10 by simultaneously interrogating all of the word columns. Dot-dash rectangle 14 encloses a group of magnetic thin film elements 16 which comprise detector means for providing an active signal indication from each word location in response to the absence of an active signal from an interrogated word column. Each of these elements 16 also comprises at least one magnetic thin film core whose PMA is shown to be horizontal in FIGURE 1.

Matrix 10 can be considered either as one matrix divided into two halves by a dash line 18, or as two separate matrices 20 and 22. The cores 12 in the upper half 20 store, in a magnetic binary sense, the 1's complement of the respective cores 12 in the lower half 22, so that the upper half may be termed the complement section, and the lower half 22 may be termed the true or non-complement section. Stored in the non-complement section 22 is a group of data words whose binary values are here assumed, for the purpose of illustration only, to be those represented by a number in parenthesis next to each thin film element therein. Although only four word columns, 1, 2, 3, and N are shown in FIGURE 1, the size of the matrix may be expanded or reduced in either direction so as to include generally N words each of M digits in length. In the complement section 20 is stored the 1's complement of the information contained in the non-complement section 22. In accordance with this scheme, wherever a 0 is contained in the non-complement section, a 1 is stored in the corresponding bit portion of the complement section, and vice versa. Thus, in the Word 1 column, thin film element $12_1$ has therein a binary 0 flux condition which is the complement of the binary 1 flux condition present in element $12_4$. Likewise, the values in elements $12_2$ and $12_3$ are complements of the values stored in respective elements $12_5$ and $12_6$.

Each horizontal row of thin film cores 12 beginning from the top of the matrix is respectively provided with an inductively coupled interrogate drive line or winding 24, 26, 28, 30, 32, and 34 terminated at ground. For each row, the said associated interrogate winding is assumed to be oriented with each element 12 therein in a direction substantially perpendicular to its PMA such that any current in the winding produces a magnetic field parallel to said PMA which either opposes the remanent flux vector therein or, alternatively, drives the core further into saturation. The inputs to these interrogate lines are supplied from individual driver amplifiers 36, 38, 40, 42, 44, and 46, respectively, which in turn are supplied from a search register 48 comprised of three flip-flops 50, 52, and 54. Drivers 36, 38, and 40 are respectively connected to the 1 output terminals of flip-flops 50, 52, and 54. Drivers 42, 44, and 46 are respectively connected to the 0 output terminals of said three flip-flops. The purpose of this search register SR48 is to simultaneously apply a plurality of signals of a predetermined polarity one on each interrogate line preselected according to a known digit order, i.e., to apply the appropriate code level digit to the proper matrix interrogate line terminal. For example, the known digit order of matrix portion 22 may be such that the true value of the most significant digits of the words are stored in the film elements 12 with which interrogate line 30 is inductively coupled, while the next most significant digits are stored in the interrogate line 32 row and the least significant digits are stored in the interrogate line 34 row. Similarly, in the complement portion 20 the complement value of the most significant digit of each word is stored in interrogate line 24 row, the next most significant digits in interrogate line 26 row and the least significant digits in interrogate line 28 row. Thus, in a manner later to be explained, the most significant digit signal of the coded quantity in SR48 will be applied to either interrogate line 24 or 30, the next most significant digit signal will be applied to either line 26 or 32, and the least significant digit signal will be applied to either line 28 or 34. As will be later more apparent, the interrogate lines of the upper half 20 of the core matrix are respectively supplied with signals only when the true value of the corresponding SR bit is a 1, while those lines for the lower half 22 are supplied with signals only when said corresponding SR bit is 0.

Respectively associated with the core columns beginning left to right are a plurality of sense output lines 60. Each line is positioned in an inductive relationship with respect to all the cores in a particular column in both matrix halves, and is oriented in a direction substantially perpendicular to the PMA of each column element such that when an interrogate pulse causes one or more of the column bistable thin film elements 12 to switch from one flux state to another, a substantial signal is induced therein. The inductive relationship is such that the induced voltages from several cores in each output line are additive.

In addition to the apparatus shown in FIGURE 1, there is normally provided conventional coincident current drive and inhibit lines for writing information into each magnetic element 12. For the sake of clarity these lines have been omitted from the drawing but it should be understood that a means is usually provided for selectively altering the remanent state of the thin film cores 12 making up matrix 10.

The operation of that portion of FIGURE 1 so far described will now be discussed. Elements 12 are assumed to have a substantially square hysteresis loop characteristic. Each of the drivers 36–46 when energized is assumed to generate a positive current pulse in its associated interrogate line which attempts to switch any core in its binary 1 remanent flux condition to a binary 0 remanent flux condition along its PMA. If such a change in flux occurs in any core 12, a substantial voltage signal is induced on the sense line inductively coupled therewith. On the other hand, if a core 12 already occupies a binary 0 flux condition, said positive current pulse in the associated interrogate line merely drives it further into saturation along its PMA but without changing the flux linking the sense line coupled therewith. Consequently, the core already in the 0 flux condition will at most produce only a small insignificant output signal in the associated output sense line if all thin films have substantially a rectangular hysteresis loop as has been assumed. The particular ones of the drivers 36–46 which are actually energized are determined according to the binary values contained in the search register 48. Furthermore, each driver also requires an enabling control signal from some control unit 62 applied thereto via a control line 64 in order to finally permit its activation. Assume for the purpose of this discussion that the three bit word held in search register 48 is comprised of bits 101 respectively held by flip-flops 50, 52, and 54 as shown by the number in parenthesis next to each. Remembering now that only the signals for the binary digits in the word being sought are applied to the proper order interrogate lines in the non-complement section 22, while signals for the 1 binary digits of the sought word are applied to the proper order interrogate lines in the complement section 20, it is seen that the interconnections between flip-flops 50–54 and drivers 36–46 cause enabling of drivers 36, 40, and 44 upon application of a control signal via line 64. The positive current pulse now applied to interrogate line 24 causes only element $12_{19}$ in word N to change state, since the other elements $12_1$, $12_7$, and $12_{13}$ already store the binary 0 flux condition. Consequently, an active voltage signal is induced on output sense winding $60_N$ because of the change in flux state of element $12_{19}$. Since driver 38 is not energized, no current pulse appears in interrogate winding 26 such that no change of flux state is possible in any of the elements 12 inductively coupled therewith. However, driver 40 is active to interrogate the elements 12 inductively coupled therewith. Since a change of flux state occurs in both elements $12_3$ and $12_9$, active voltage signals are therefore induced on output sense windings $60_1$ and $60_2$. The next driver 42 is not energized, but the following driver 44 causes a positive current pulse in interrogate winding 32. This pulse changes the states of elements $12_{11}$ and $12_{23}$ to thereby induce voltage signals on the respective sense windings $60_2$ and $60_N$. These are added to any other voltages induced therein by changes of state in any other elements inductively coupled with said sense lines. Driver 46 is not energized.

Figures 2A, 2B:
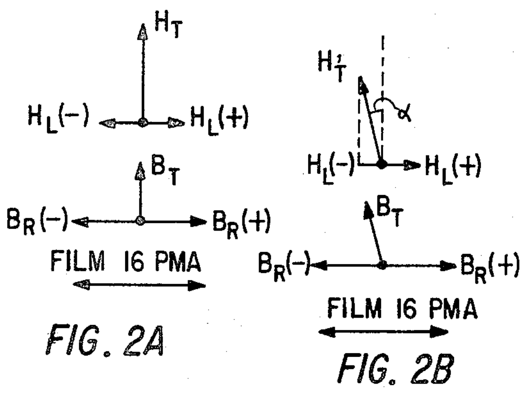
FIGURES 2A and 2B illustrate flux and field orientations.

Referring back to the foregoing operational description, it can be seen that at least one thin film element is switched which is in inductive relationship with all of the output sense lines except $60_3$. Line $60_3$, therefore, is the only sense line on which no substantial active signal is induced. This is taken to mean that a perfect match was found between the word stored in search register 48 and the word stored in column 3 of matrix 10. The induced voltages on the remaining sense lines $60_1$, $60_2$ and $60_N$ indicate a mismatch between the word in SR being sought and the contents of the respective word columns 1, 2, and N. In many search memory applications it is therefore necessary to terminate each of the word sense lines 60 with an active detector performing logical negation, to thereby produce an active output for that word line having no induced active signal at the time that the search memory matrix 10 is interrogated. The present invention contemplates utilizing the plurality of magnetic thin film elements 16 as the logical negation detectors rather than using some active semiconductor device, such as a transistor amplifier-inverter, for this function. Thus, each detecting element 16 is inductively coupled with an individual word sense winding 60 oriented substantially perpendicularly with the PMA of core 16. Each sense line 60 is a closed current loop and acts as a longitudinal magnetic steering field line for its associated detector 16. Consequently, as illustrated in FIGURE 2A, whenever an induced active voltage signal is generated in a sense line 60 upon interrogation of the search memory matrix 10, current of some polarity appears in said sense line and generates a magnetic field $H_L$ at element 16 lying parallel to the PMA therein which can act to steer and cause the remanent flux vector $B_R$ therein to lie in a particular direction along its easy axis. A single drive line 66 is inductively coupled with all of the detector elements 16 and in turn is energized by a driver 68 temporarily actuated by control 62 via line 70. Drive winding 66 is coupled to each detector 16 in a direction so as to apply a magnetic field $H_T$ transverse to the PMA thereof in order to rotate the flux therein to a direction shown by vector $B_T$ away from the easy axis, preferably near or at a right angle thereto, i.e., parallel to the so-called "hard" axis of the element. The trailing edge of the transverse field $H_T$ coincides with outputs on sense lines 60. Output sense lines 72, $72_2$ . . . $72_N$ are also provided, one for each respective detector film 16. Each said sense line 72 is inductively coupled with its detector 16 and is oriented to be responsive to flux rotation therein for producing an active induced output signal.

In order to briefly describe the interaction between memory matrix 10 and detector matrix 14, consider now but a single detector element $16_1$ having the transverse drive line 66, a longitudinal steer line $60_1$, and the additional output sense line $72_1$. A transverse field $H_T$ substantially greater than the field of anisotropy is temporarily applied to detector film $16_1$ by current in drive winding 66 so that the flux vector rotates to the position of flux vector $B_T$. At the time that said transverse field $H_T$ is subsequently terminated, matrix 10 is interrogated. If a positive steering field $H_L(+)$ is present by virtue of certain polarity induced current in sense winding $60_1$, then the flux in detector film $16_1$ reverts to a direction along its PMA with a positive vector of remanent magnetization $B_R(+)$. In a similar manner, if a negative steering field $H_L(-)$ is applied to detector $16_1$ by current flow in the opposite direction through sense winding $60_1$, the termination of current in drive winding 66 in the presence of said negative steering field causes the detector film $16_1$ flux to revert to the opposite direction along its PMA with a negative vector of remanent magnetization $B_R(-)$. In the case of the particular search memory shown in FIGURE 1, said opposite current flow in sense winding $60_1$ is conveniently produced by connecting it to a source $-V$ of negative biasing potential which constantly maintains current flow in this opposite direction (thus generating field $H_L(-)$) unless overcome by voltage induced in the sense winding whenever an element 12 changes flux state which in turn causes a temporary flow of current to generate field $H_L(+)$. Once detector film $16_1$ has had a particular flux condition $B_R(+)$ or $B_R(-)$ stored therein, as determined by the respective presence or absence of an induced signal in winding $60_1$, control unit 62 activates driver 68 to once again cause current flow in drive winding 66. This drive current again rotates the flux in element $16_1$ away from its easy axis to a position shown by $B_T$. Depending upon the (+) or (−) easy axis direction in which the remanent magnetization $B_R$ lies just prior to this rotation, either a positive or a negative active induced voltage appears on output sense winding $72_1$ during rotation which can be used by a utilization means not shown in FIGURE 1.

Instead of tying the output sense lines 60 to a biasing source $-V$ (in order to provide the opposite polarity current during the absence of an induced voltage signal) it is possible to slightly skew each film element 16 so that the transverse field $H_T$ lies to the negative direction side of the hard axis at some angle $\alpha$. An $H_L(-)$ field is thereby generated by resolving field $H_T$ into longitudinal and perpendicular component vectors. In the absence of the induced field $H_L(+)$, said component field $H_L(-)$ acts to steer the flux vector $B_T$ to the $B_R(-)$ direction. This technique is illustrated in FIGURE 2B.

The principal problem in steering one film 16 with the output from another film 12 lies in obtaining the necessary amplitude of the steering field $H_L$. Two major factors set a lower bound to this amplitude: (1) the easy-axis dispersion of the steered film 16; and (2) the impedance of the transfer loop formed by the steering word sense line 60. In general, the easy-axis dispersion varies inversely with film diameter, so that a fairly large detector film 16 appears desirable. On the other hand, in determining this diameter one must also take into consideration the fact that the steering field $H_L$ from line 60 varies inversely (if current is held constant) with the width of said line as it passes over the film, so that a small detector film diameter would be desirable from the standpoint of obtaining the largest field $H_L$ for any given current. As for the second major factor, the impedance of the transfer loop (which affects the size of the steering current and hence the steering field) consists not only of its inductance and resistance, but also of the back EMF generated therein by the steered film 16 as its magnetization vector $B_T$ returns to the easy axis. If these dispersion and impedance factors were linear, an ideal film size could be calculated. However, they are not linear so that the optimum size of film 16 is normally determined by well-known experimental techniques for each specific environment wherein the present invention is employed.

Another property of film 16 which should be considered is its reversible limit, normally defined to be the maximum angle away from the PMA through which the film magnetization would ordinarily return to the easy axis in the same predetermined direction without requiring any $H_L$ field. When flux $B_T$ begins to rotate back to the PMA of film 16 from its substantially perpendicular position, the steering field $H_L(+)$ or $H_L(-)$ preferably should be applied at least until this magnetization vector has reached its reversible limit, in order to insure that said vector continues to fall along the PMA in the proper direction.

When the word output sense winding 60 is oriented substantially perpendicular to the PMA of each steering film 12 (i.e. parallel to the hard axis as shown in FIGURE 1), a further consideration should be given to the relative sizes of particular cross-sectional areas in film element 12 and film element 16 which are defined in each by the film thickness as one dimension and the length along the hard axis as the other dimension. A more generic definition might be those cross-sectional areas as measured through the film thicknesses in planes oriented in the direction of the transfer loop winding. These dimensions determine the flux linkage to the sense winding transfer loop. If typical permalloy material is used for each film having an $H_K$ of 4.5 oersteds and a reversible limit of between 30 and 60 degrees of the easy axis, theoretical calculations appear to indicate that when said cross-sectional area of film 12 is equal to said area of film 16, the possibility of steering film 16 by a film 12 may be at best marginal. Therefore, said cross-sectional area of the steering film 12 preferably should be larger than said cross-sectional area of steered film 16, at least for the magnetic material specified above. However, a particular ratio of film 12 area to film 16 area cannot and should not be fixed for several reasons. One is that better dispersion and reversible limit properties of film 16 material would cause a decrease in this ratio. Another is that the transfer loop impedance determines the amount of steering current that can be obtained from a given steering film 12, so that a better or worse design of the transfer loop also affects this ratio.

Figure 3:
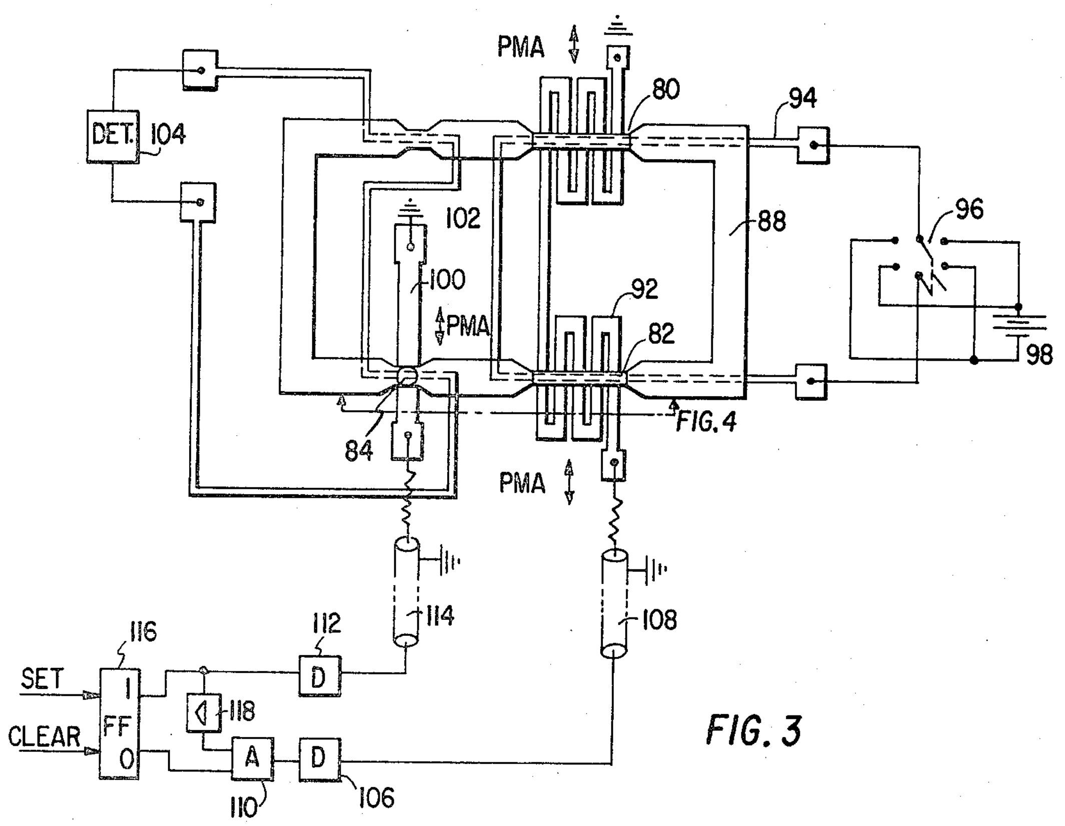
FIGURE 3 is a circuit schematic for illustrating the principles of the present invention.
Figures 4, 5:
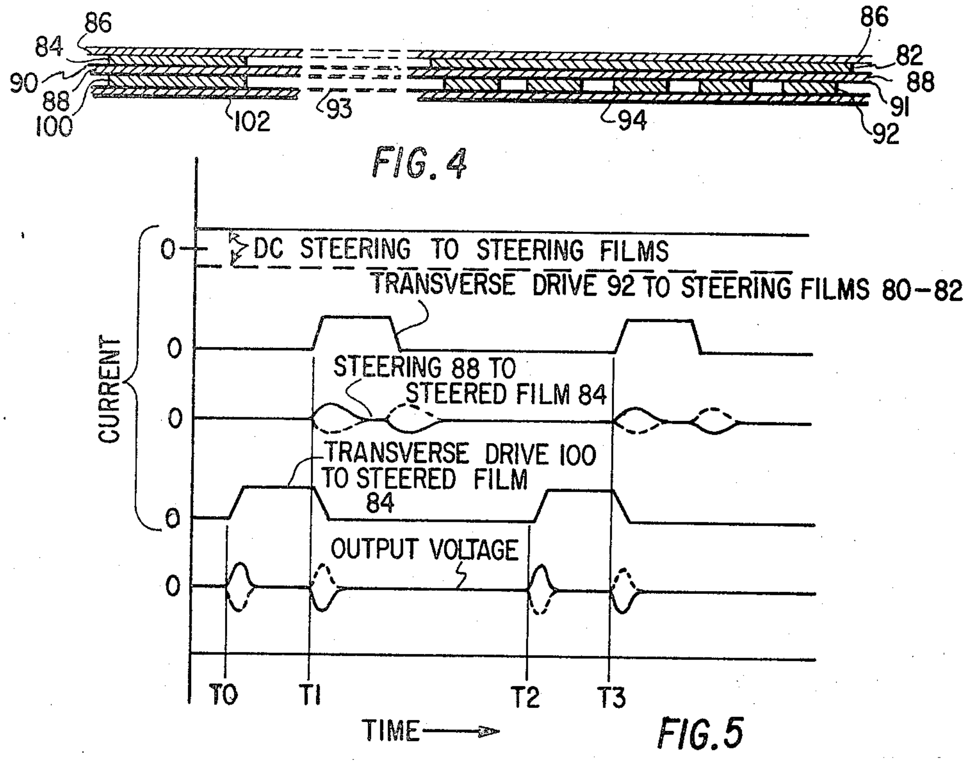
FIGURE 4 is a cross-sectional view of a portion of the circuitry in FIGURE 3.
FIGURE 5 is a timing diagram showing the timewise relationship of various signals employed in the invention.

Reference is now made to FIGURES 3 and 4 which respectively show the plan and cross-sectional elevational views of an actual circuit built to demonstrate this novel principle of steering one thin film by the output of another, and having utility by itself or in combination with other components. Two rectangular 1 mm. by 10 mm. magnetic thin films 80 and 82 are used to provide a steering field to a round magnetic thin film element 84 2 mm. in diameter. Each film has a thickness of about 1000 angstrom units, with all PMA's being in the same vertical direction as shown in FIGURE 3. All films are of permalloy and can either be evaporated or electro-deposited directly on a ground plane which is preferably copper plated nickel phosphorous. A conducting transfer loop winding 88 is inductively coupled with all of the thin films 80, 82, and 84 being separated therefrom by a layer of silicon oxide coating 90 of about 30,000 angstroms thick, or perhaps thinner. As the transfer loop 88 passes adjacent to each thin film element, it is oriented substantially perpendicular to its easy axis which has been assumed to be vertical in FIGURE 3, i.e., parallel to the hard axis. The continuous transfer loop 88 is thus equivalent to the word sense winding 60 in FIGURE 1, especially as regards its orientation with the easy axis of steered thin film element 84. The combined hard axis length of the steering film configuration (comprised of the two elements 80 and 82 which, when switched, induced additive voltages on the transfer loop) is about 20 mm. compared to the 2 mm. hard axis length in the steered film 84. Since film thicknesses are identical, it is therefore seen that the flux linkage cross-sectional area is substantially larger in the steering film. While two separate elements 80 and 82 were actually employed in FIGURE 3 primarily for ease in fabrication of the circuit, a single steering film element can be used, with appropriate thickness and flux linkage length so as to provide the necessary steering current in the transfer loop.

The steering elements 80 and 82 are interrogated (switched) by current in a zig-zag drive line 92 which crosses over each in a direction substantially parallel to the easy axis. This drive line is insulated from the transfer loop 88 by a thin layer of Mylar 91. The field produced by current in said drive winding 92 is substantially transverse to the PMA of each steering film element in order to rotate the flux vector therein away from the easy axis stable position in which it is aligned. The zig-zag design of winding 92 reduces the transverse drive current requirements. In order to selectively store either a binary 1 or a binary 0 value into the steering elements 80 and 82, a D.C. current bias winding 94 insulated by Mylar layer 93 is also inductively coupled therewith in a direction essentially perpendicular with the easy axis of each. Constant current flowing in bias winding 94 of either polarity thus sets up a longitudinal steering field in each of the elements 80 and 82 which determines the direction of remanent flux therein whenever current in drive winding 92 is terminated. In this way either a binary 1 remanent flux condition or a binary 0 remanent flux condition can be established in each steering film element. The particular current polarity in bias winding 94 is governed by the position of a double pole-double throw switch 96 which reverses the terminal connections of a battery 98 to said winding.

A transverse drive winding 100 is inductively coupled with the steered element 84 in a direction approximately parallel to the easy axis thereof. Current in drive winding 100 therefore sets up a field which rotates the flux vector in element 84 away from a stable position along the easy axis and to a position approximately parallel with the hard axis. A sense winding 102 is also inductively coupled with element 84 in the direction substantially perpendicular to its easy axis, so that any rotation of flux within element 84 causes a change in flux linking said sense winding to thereby induce therein an active voltage signal. The particular polarity of said induced voltage signal is determined by the particular direction of flux rotation in element 84 at the time that drive current is first applied to winding 100, and also when said drive current is subsequently terminated. That is to say, if remanent flux in element 84 initially lies in a negative direction along the easy axis, FIGURE 2A, so as to be rotated clockwise to the hard axis upon application of a drive pulse, the polarity of the induced signal in sense winding 102 is opposite to that polarity induced therein if flux rotation is instead rotated counterclockwise because of remanent flux initially lying in the opposite positive direction along the easy axis. Some form of detecting means 104 may be connected across the terminals of winding 102 either to indicate polarity of the output signal, or merely presence thereof. In connection with the sensing of the film 84 state, it might be mentioned here that the transfer loop winding 88 could also be employed to detect the rotation of flux to the hard axis of film 84, since both it and sense winding 102 are oriented in the same direction. Thus, certain embodiments of the invention may eliminate the additional sense winding 102 (and sense windings 72 in FIGURE 1), with the transfer loop serving a dual purpose at different times in the cycle.

A circuit arrangement is provided to apply drive currents to windings 92 and 100 in proper sequence which may also be used as the control unit 62 in FIGURE 1. A driver element 106 is connected via a shielded lead 108 to one terminal of transverse drive winding 92, the other terminal of which is grounded. An output is required from an AND gate 110 before driver 106 can produce a current pulse in drive winding 92 of some fixed, predetermined polarity. A second driver 112 likewise is connected via a shielded lead 114 to one end of transverse drive winding 100, the other end of which is grouned. A flip-flop 116 can be either set to 1 or cleared to 0, with an energizing signal being applied to driver 112 whenever flip-flop 116 is in its set condition. AND gate 110 receives an input both from the 0 output terminal of flip-flop 116, and from the 1 output terminal thereof via a delay line element 118. Under the assumption that flip-flop 116 is in a clear condition, a SET pulse applied thereto immediately causes an activating signal to be applied to driver 112 which in turn produces a current pulse of predetermined polarity through drive winding 100. This activating signal from the 1 output terminal of flip-flop 116 is also applied later via delay line 118 to AND gate 110 which, however, cannot produce an output on receipt thereof because of the now absent signal from the 0 output terminal of flip-flop 116. Consequently, driver 106 remains unenergized. When a Clear signal is later applied to flip-flop 116, the 0 output terminal thereof now applies a signal to one input of AND gate 110. Although the output to driver 112 from the 1 output terminal immediately disappears, a signal continues to be applied to AND gate 110 via delay line 118 for a short period of time after flip-flop 116 is cleared. Consequently, driver 106 becomes energized immediately when driver 112 is terminated, and will continue energized for a period of time governed by the delay imparted by element 118 to the signal from the 1 output terminal. In this way, the trailing edge of the period of time during which current flows in winding 100 is made to coincide with the leading edge of the time period during which current flows in winding 92. An alternative control circuit to the one shown in FIGURE 3 is merely the use of any well known pulse generator having its output directly connected to winding 100, and through a delay line element to winding 92. In this alternative circuit the time delay of the delay element is made about equal to the pulse width so that the above described coincidence of time period edges can occur.

To understand the operation of the circuit in FIGURES 3 and 4, reference is now made to FIGURE 5 which indicates the relative duration and phasing of signals in this circuit. FIGURE 5 also gives a better understanding of FIGURE 1. Assume first that switch 96 is thrown so that a positive D.C. current is applied to bias winding 94 in order to steer the remanent magnetization in each of the films 80 and 82 to a predetermined first direction along the PMA whenever a transverse field thereacross is terminated. Next, flip-flop 116 is set to its 1 condition at time T0 to produce a current in drive winding 100 of a polarity assumed as indicated in FIGURE 5. This current creates a magnetic field transverse to the easy axis in said film 84 rotating the flux vector therein to a position $B_T$ substantially normal to said easy axis. Depending upon the direction of this rotation, either a positive going or negative going voltage output is induced on sense winding 102 at the leading edge of this transverse drive pulse in winding 100. When flip-flop 116 is next cleared at some subsequent time T1, the flux vector $B_T$ in film 84 rotates back toward its easy axis in a direction $H_L(+)$ or $H_L(-)$ which in turn is determined by the direction of current in transfer loop 88. In order to generate current in transfer loop 88 at time T1, driver 106 is then energized and is assumed to provide a drive current pulse to winding 92 in the direction shown in FIGURE 5. The leading edge of the drive winding 92 pulse coincides with the trailing edge of the drive winding 100 pulse. Drive winding 92 current rotates the flux vectors in elements 80 and 82 in a direction to become substantially normal to the easy axis of each. If said flux vectors are rotated in a clockwise direction, a positive current pulse is assumed to be generated in transfer loop 88 at the leading edge of the drive 92 pulse. On the other hand, if these flux vectors in films 80 and 82 rotate to the hard axis in a counterclockwise direction, a negative going current pulse is assumed to be generated in loop 88. A positive current pulse in loop 88 sets up a longitudinal steering field $H_L(+)$ along one direction of the film 84 easy axis, while a negative current pulse in loop 88 sets up the opposite direction longitudinal field $H_L(-)$ in said steered element. Since said longitudinal field is present in film 84 at the time T1 that the transverse drive 100 pulse terminates, the flux vector in film 84 is steered in said longitudinal direction upon its return to the easy axis and at the same time, an output voltage signal is induced on sense line 102 depending upon the direction in which this flux vector falls.

At some time subsequent to T1 the transverse drive 92 current pulse is also terminated. This means that the flux vectors in films 80 and 82 now fall to one side or the other of the hard axis according to the polarity of the D.C. current in winding 92 which acts to generate a steering field for elements 80 and 82 in order to govern the binary value stored therein (which are the same in each). An induced voltage is also produced on transfer loop 88 which has no effect upon element 84 at this time.

If now element 84 is driven once again at some following T2 time by a current pulse in winding 100, the polarity of the output signal induced on winding 102 is determined by the direction in which the flux vector in film 84 rotates when going from the easy axis to the hard axis. As has been mentioned before, this direction is governed by the direction to which the flux vector in film 84 was steered during previous time T1. Consequently, the particular polarity of the output signal at time T2 on winding 102 gives an indication as to the polarity of the signal induced on transfer loop 88 during T1 which in turn is determined by the binary content of films 80 and 82. At time T3, the steered film drive pulse terminates and the steering film drive pulse begins so as to cause the flux in film 84 to be steered back to a predetermined direction along its PMA.

In FIGURE 3 it should be noted that a flux state change at the leading edge of a drive 92 interrogate pulse is always accompanied by an opposite flux state change at its trailing edge so that opposite polarity signals are induced on the transfer loop winding. Thus, by making the trailing edge of the drive 92 pulse coincide with the trailing edge of the drive 100 pulse, steering could also be performed in film 84 for this change in signal phase. This alternative mode of operation would appear feasible in the typical non-destructive readout type of search memory wherein, for example, the well known bicore element is used having a memory film for storing the information bit, and a readout film whose flux vector direction is determined by the field from the memory core. Furthermore, it should be appreciated that the basic word column organization shown in FIGURE 1, wherein several elements 12 are inductively coupled with the same transfer loop, lends itself to functions other than use in a search memory. For example, since the detector film 16 is basically a minimum threshold device because of a certain minimum steering current required either to overcome the D.C. bias voltage −V (in FIGURE 1) or the effect of a skewed drive line 66, an AND function could be performed where all elements 12 must be switched to obtain the necessary steering current. In similar fashion, MAJORITY DECISION and INHIBIT functions could be performed. Thus, while certain embodiments of the present invention have been shown and/or described, it can be incorporated into many other environments by those skilled in the art without departure from the novel principles defined in the appended claims.

The embodiments of the invention in which an exclusive property or privilege is claimed are defined as follows:

1. A magnetic thin film circuit comprising:

(a) a steering magnetic thin film configuration of the preferred magnetic axis and multiflux state type;

(b) a steered magnetic thin film configuration of the preferred magnetic axis and multiflux state type;

(c) a closed loop transfer winding inductively coupled with said steered film configuration and oriented therewith in a direction substantially transverse to a preferred magnetic axis thereof, said transfer winding also being inductively coupled with said steering film configuration;

(d) first drive field generating means inductively coupled with said steered film configuration and selectively operable for a predetermined first period of time to rotate flux therein to a direction substantially transverse to said preferred magnetic axis thereof; and (e) second drive field generating means inductively coupled with said steering film configuration and selectively operable for a predetermined second period of time, one edge of which coincides with the trailing edge of said first period of time, to change at least a predetermined one of the flux states which said steering film configuration might be in to another in a manner to induce a voltage in said transfer winding sufficient to produce a current therein when said first drive field is terminated at the trailing edge of said first period of time for at least attempting to steer rotated flux in said steered film configuration to a predetermined direction along said preferred magnetic axis thereof.

2. The circuit according to claim 1 wherein said first drive field generating means includes a drive winding inductively coupled with said steered film configuration and oriented in a direction approximately parallel with said preferred magnetic axis thereof.

3. The circuit according to claim 1 wherein the leading edge of said second period of time coincides with the trailing edge of said first period of time.

4. The circuit according to claim 1 wherein the relative sizes of cross-sectional areas in said steering and steered film configurations, as measured through their thicknesses in planes oriented in the direction of said transfer winding, are such that the former is larger than the latter.

5. The circuit according to claim 1, wherein said second drive field generating means includes drive winding means oriented substantially transverse to the preferred magnetic axis of said steering film configuration, said predetermined one and said another flux states being states wherein the flux in the steering film configuration lies in one direction or the other along the preferred magnetic axis thereof.

6. The circuit according to claim 1 wherein said transfer winding is oriented in a direction approximately perpendicular to both the said preferred magnetic axis of said steered film configuration and also to a preferred magnetic axis of said steering film configuration.

7. The circuit according to claim 6 wherein the relative sizes of cross-sectional areas in said steering and steered film configurations, as defined by their thicknesses and hard lengths, are such that the former is larger than the latter.

8. The circuit according to claim 7 wherein the leading edge of said second period of time coincides with the trailing edge of said first period of time.

9. A magnetic thin film circuit comprising:

(a) a steering magnetic thin film configuration of the preferred magnetic axis and multiflux state type;

(b) a steered magnetic thin film configuration of the preferred magnetic axis and multiflex state type;

(c) a closed loop transfer winding inductively coupled with said steered film configuration and oriented therewith in a direction substantially transverse to a preferred magnetic axis thereof, said transfer winding also being inductively coupled wtih said steering film configuration and further having biasing means for normally causing current flow therein in one predetermined direction;

(d) first drive field generating means inductively coupled with said steered film configuration and selectively operable for a predetermined first period of time to rotate flux therein to a direction perpendicular to said preferred magnetic axis thereof; and (e) second drive field generating means inductively coupled with said steering film configuration and selectively operable for a predetermined second period of time, one edge of which coincides with the trailing edge of said first period of time, to change a predetermined one of the flux states which said steering film configuration might be in to another in a manner to induce a voltage in said transfer winding sufficient to produce a current in the opposite direction therein when said first drive field is terminated at the trailing edge of said first period of time for at least attempting to steer rotated flux in said steered film configuration to a predetermined direction along said preferred magnetic axis thereof, wherein said normal current flow in said transfer winding at least attempts to steer said rotated flux to the opposite direction along said preferred magnetic axis thereof.

10. The circuit according to claim 9 wherein the leading edge of said second period of time coincides with the trailing edge of said first period of time.

11. The circuit according to claim 9 wherein the relative sizes of cross-sectional areas in said steering and steered film configurations, as measured through their thicknesses in planes oriented in the direction of said transfer winding, are such that the former is larger than the latter.

12. The circuit according to claim 9 wherein is further included sense means inductively coupled with said steered film configuration for detecting flux rotation therein.

13. A magnetic thin film circuit comprising:

(a) a steering magnetic thin film configuration of the preferred magnetic axis and multiflux state type;

(b) a steered magnetic thin film configuration of the preferred magnetic axis and multiflux state type;

(c) a closed loop transfer winding inductively coupled with said steered magnetic film configuration and oriented therewith in a direction substantially transverse to a preferred magnetic axis thereof, said transfer winding also being inductively coupled with said steering film configuration;

(d) first drive field generating means inductively coupled with said steered film configuration and selectively operable for a predetermined first period of time to rotate flux therein to a direction substantially transverse to said preferred magnetic axis thereof but at an angle with and to one side of a perpendicular thereto:

(e) second drive field generating means inductively coupled with said steering film configuration and selectively operable for a predetermined second period of time, one edge of which coincides with the trailing edge of said first period of time, to change a predetermined one of the flux states which said steering film configuration might be in to another in a manner to induce a voltage in said transfer winding sufficient to produce a current therein when said first drive field is terminated at the trailing edge of said first period of time for at least attempting to steer rotated flux in said steered film configuration to a direction along said preferred magnetic axis thereof which is opposite to said one side of said perpendicular.

14. The circuit according to claim 13 wherein said first drive field generating means includes a drive winding inductively coupled with said steered film configuration and slightly skewed out of parallel relationship with respect to said preferred magnetic axis thereof.

15. The circuit according to claim 13 wherein the leading edge of said second period of time coincides with the trailing edge of said first period of time.

16. The circuit according to claim 13 wherein the relative sizes of cross-sectional areas in said steering and steered film configurations, as measured through their thickness in planes oriented in the direction of said transfer winding, are such that the former is larger than the latter.

17. The circuit according to claim 13 wherein is further included sense means inductively coupled with said steered film configuration for detecting flux rotation therein.

18. A magnetic thin film circuit comprising:

(a) a steering magnetic thin film configuration of the preferred magnetic axis and multiflux state type;

(a) a steered magnetic thin film configuration of the preferred magnetic axis and multiflux state type;

(c) a closed loop transfer winding inductively coupled with said steered film configuration and oriented therewith in a direction substantially transverse to a preferred magnetic axis thereof, said transfer winding also being inductively coupled with said steering film configuration;

(d) first drive field generating means inductively coupled with said steered film configuration and selectively operable for a predetermined first period of time to rotate flux therein to a direction substantially transverse to said preferred magnetic axis thereof;

(e) second drive field generating means including winding means inductively coupled with said steering film configuration and oriented transverse to the preferred magnetic axis thereof, said second drive means being selectively operable for a predetermined second period of time, one edge of which coincides with the trailing edge of said first period of time, to change at least a predetermined one of the flux states which said steering film configuration might be in to another in a manner to induce a voltage in said transfer winding sufficient to produce a current therein when said first drive field is terminated at the trailing edge of said first period of time for at least attempting to steer rotated flux in said steered film configuration to a predetermined direction along said preferred magnetic axis thereof; and (f) sense means inductively coupled with said steered film configuration for detecting flux rotation therein.

19. The circuit according to claim 18 wherein said sense means includes a sense winding inductively coupled with said steered film configuration in a direction approximately perpendicular to its said preferred magnetic axis.

20. The circuit according to claim 19 wherein the leading edge of said second period of time coincides with the trailing edge of said first period to time.

21. The circuit according to claim 19 wherein the relative sizes of cross-sectional areas in said steering and steered film configurations, as measured through their thicknesses in planes oriented in the direction of said transfer winding, are such that the former is larger than the latter.

22. A magnetic thin film search memory circuit comprising:

(a) a plurality of steering magnetic thin film configurations of the preferred magnetic axis and multiflux state type, each storing a respective bit of a multibit word for which a search is to be made;

(b) a steered magnetic thin film configuration of the preferred magnetitc axis and multiflux state type;

(c) a closed loop transfer winding inductively coupled with said steered magnetic film configuration and oriented therewith in a direction substantially transverse to a preferred magnetic axis thereof, said transfer winding also being inductively coupled with each of said plurality of steering film configurations;

(d) first drive field generating means inductively coupled with said steered film configuration and selectively operable for a predetermined first period of time to rotate flux therein to a direction substantially transverse to said preferred magnetic axis thereof; and (e) a plurality of second drive field generating means, each inductively coupled with a different one of said plurality of steering film configurations and selectively operable according to a respective bit of a search word for a predetermined second period of time, one edge of which coincides with the trailing edge of said first period of time, to change at least a predetermined one of the flux states which said inductively coupled steering film configuration might be in to another in a manner to induce a voltage in said transfer winding when said first drive field is terminated at the trailing edge of said first period of time for steering rotated flux in said steered film configuration to a predetermined direction along said preferred magnetic axis.

23. The circuit according to claim 22 wherein said first drive field generating means includes a drive winding inductively coupled with said steered film configuration and oriented in a direction approximately parallel with said preferred magnetic axis thereof.

24. The circuit according to claim 22 wherein the leading edge of said second period of time coincides with the trailing edge of said first period of time.

25. The circuit according to claim 22 wherein is further included sense means inductively coupled with said steered film configuration for detecting flux rotation therein.

26. The circuit according to claim 22 wherein is further included biasing means for said transfer winding for normally causing current flow therein in a direction at least attempting to steer said rotated flux in said steered film configuration to the opposite direction along said preferred magnetic axis.

27. The circuit according to claim 22 wherein said first drive field generating means includes a drive winding inductively coupled with said steered film configuration and slightly skewed out of parallel relationship with respect to said preferred magnetic axis thereof for rotating flux therein to a direction at an angle with a perpendicular to said preferred magnetic axis but to the side of said perpendicular opposite to said predetermined direction.

28. A magnetic thin film search memory circuit comprising:

(a) a first and a second plurality of steering magnetic thin film configurations of the preferred magnetic axis and multiflux state type, there being one configuration in each of said pluralities for each bit of a word, said second plurality storing complements of the bits stored by said first plurality;

(b) a steered magnetic thin film configuration of the preferred magnetic axis and multiflux state type;

(c) a closed loop transfer winding inductively coupled with said steered magnetic film configuration and oriented therewith in a direction substantially transverse to a preferred magnetic axis thereof, said transfer winding also being inductively coupled with each of said steering film configurations in both said pluralities;

(d) first drive field generating means inductively coupled with said steered film configurations and selectively operable for a predetermined first period of time to rotate flux therein to a direction substantially transverse to said preferred magnetic axis thereof;

(e) a plurality of second drive field generating means, each inductively coupled with a different one of said plurality of steering film configurations and selectively operable according to a respective bit of a search word for a predetermined second period of time, one edge of which coincides with the trailing edge of said first period of time, to change at least a predetermined one of the flux states which said inductively coupled steering film configuration might be in to another in a manner to induce a voltage in said transfer winding when said first drive field is terminated at the trailing edge of said first period of time for steering rotated flux in said steered film configuration to a predetermined direction along said preferred magnetic axis;

(f) said plurality of second drive field generating means including a plurality of drive windings, one for each configuration in each of said first and second pluralities and each oriented transverse to the preferred magnetic axis thereof, said second drive field generating means also including a plurality of bistable means each connected to selectively drive one of the drive windings associated with said first plurality of steering film configurations and one of the drive windings associated with said second plurality of steering film configurations; and, (g) sense means inductively coupled with said steered film configuration for detecting flux rotation therein.

References Cited

UNITED STATES PATENTS

| | | | |
|---|---|---|---|
| 3,126,529 | 3/1964 | Hempel | 340—174 |
| 3,161,862 | 12/1964 | Williams | 340—174 |
| 3,222,645 | 12/1965 | Davis | 340—174 |

STANLEY M. URYNOWICZ, Jr., *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,405,398 October 8, 1968

William B. Johnson

It is certified that error appears in the above identified patent and that said Letters Patent are hereby corrected as shown below:

Column 11, line 48, "and hard lengths," should read -- and hard axis lengths, --. Column 13, line 4, "(a)" should read -- (b) --.

Signed and sealed this 24th day of February 1970.

(SEAL)
Attest:

Edward M. Fletcher, Jr.
Attesting Officer

WILLIAM E. SCHUYLER, JR.
Commissioner of Patents